July 1, 1930.　　　N. T. FOX　　　1,768,899

RELEASE VALVE

Filed May 16, 1929

INVENTOR
NATHANIEL T. FOX.
By W. L. Dempsey
ATTORNEY.

Patented July 1, 1930

1,768,899

UNITED STATES PATENT OFFICE

NATHANIEL T. FOX, OF VENICE, ILLINOIS

RELEASE VALVE

Application filed May 16, 1929. Serial No. 363,441.

This invention relates to release valves and is particularly designed as a release valve for auxiliary air reservoirs in railway air brake systems.

The chief object of my invention is to provide a release valve which, when installed in an air line and manually opened, will automatically close when the air pressure on both sides of the valve becomes equal.

Another object of my invention is the production of a release valve especially adapted to release the air from an auxiliary reservoir located in the line of an air brake system that will be quick and positive in action and that can be manufactured at a relatively low cost.

Other objects and advantages of my invention will be apparent from the specification, claims and drawings, in which:

Figure 1:
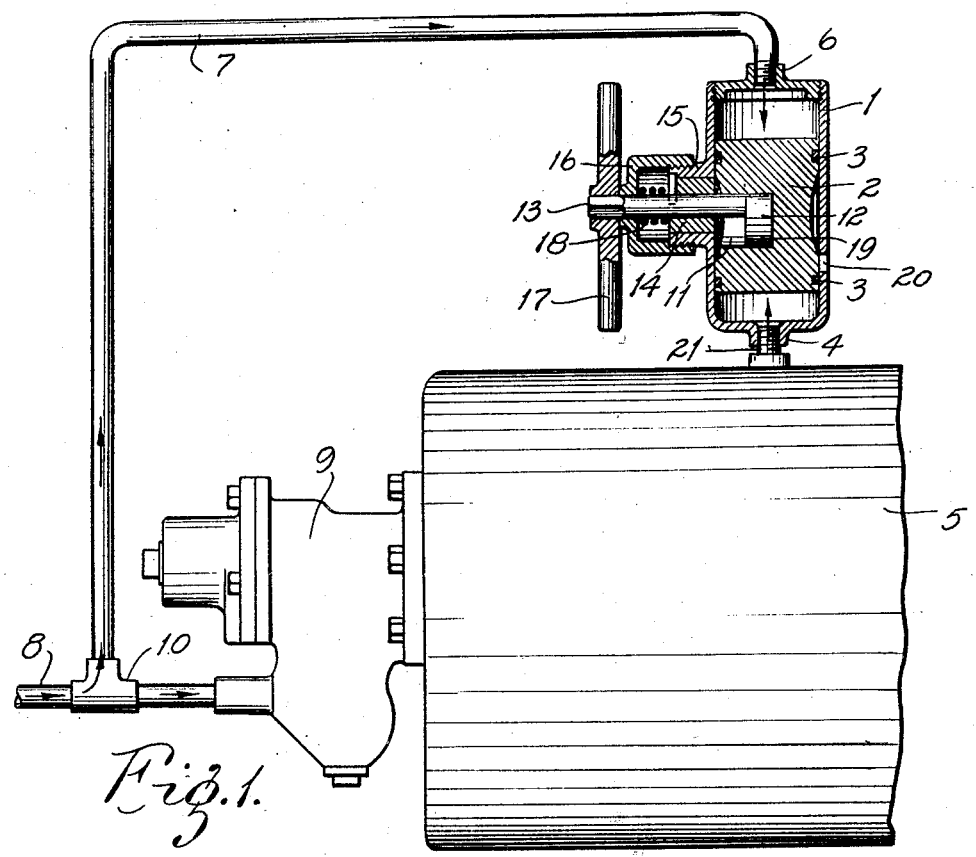
Fig. 1 is a view of my release valve partly in section installed in the air line of a braking system.

The air braking system as applied to railway trains comprises a compressor located upon the locomotive. On the compressor an air line conducts the compressed air along the entire train. On each individual freight car or passenger coach an auxiliary reservoir is located and is in regulated communication with the brake cylinder and the air line that conducts the air from the compressor located on the engine.

The purpose of the auxiliary air reservoir is to increase the efficiency of the system by having a supply of air located on each car. The air is supplied to the auxiliary reservoir through what is known as a triple valve. But, one train may be made up of fifty or sixty cars, and when stopped by the air brakes on each individual car, under the present practice, the pressure in the auxiliary reservoir is reduced by releasing the air to the atmosphere through a manually controlled release valve which is connected to a lever rod running from underneath the car out to the side of the car where it can be readily operated by the train attendants.

The present release valve in use on railways is normally in a closed position and in order to exhaust the air from the auxiliary reservoir it is necessary for the trainmen to open the valve manually and hold it open until sufficient time has elapsed for the pressure to drop because the air has been discharged to the atmosphere.

The time required for releasing each valve is approximately one minute or slightly less, so that where the valves have to be manually held open, in a train of sixty cars, it requires one hour by one man, or thirty minutes by two men, to release all the valves. It is the object of my invention to reduce the time required to release the air from the auxiliary reservoir which in turn releases the brakes, hence I have devised a valve which needs only to be opened and will automatically close when the pressure in the auxiliary reservoir is sufficiently reduced. It is obvious that by so doing a vast amount of time in the aggregate will be saved to the railroads by shortening the time that it is necessary for the train to stand idle until its brakes are released.

In my preferred method of construction, I provide a cylinder 1 having a piston 2, provided with piston rings 3, reciprocable therein and adapted to be put into open communication at its lower end 4 with an auxiliary reservoir 5.

The upper end of the cylinder 6 is adapted to be put into open communication by means of the pipe 7 with the main air line 8, which in turn is in open communication with an air compressor located upon the locomotive.

The line 8 is also in communication with the reservoir 5 through what is known as a triple valve 9.

Air under pressure passing through the line 8, upon reaching the T 10 would evidently divide, a portion of it going through the triple valve 9 into the reservoir 5, and the other portion passes through the line 8 and enters my valve from the top tending to force the piston downwardly to the limit of its stroke.

Intermediate of the ends of the piston an aperture 11 is provided in which an eccentric 12 is rotatably mounted, the eccentric being integral with the stem 13 of the valve which is rotatably mounted in a bushing 14 held in place by a boss 15 externally screw-threaded on its outer end adapted to engage internal threads in a cover cap 16.

A lever or hand wheel 17 is rigidly attached to the outer end of the valve stem 13 by means of which the cam 12 may be rotated. It is obvious that if the lever or hand wheel 17 be rotated anti-clockwise, the cam 12 would lift the piston 2 to its upper position as shown in Fig. 2, and it would remain in that position until turned clockwise.

A helical torsion spring 18 is rigidly attached at its inner end to the valve stem 13 and rigidly attached at its outer end to the cover cap 16 in such a manner that the eccentric 12 will be normally held with its top or toe 19 projecting downwardly a few degrees from a vertical line for the purpose of having the cam 11 always off dead center.

Figure 2:
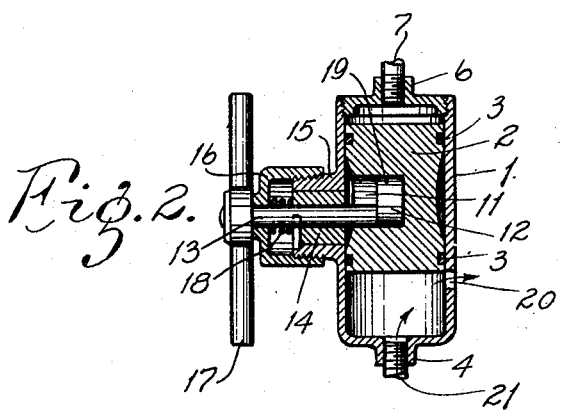
Fig. 2 is a longitudinal sectional view of my valve shown in its open position.

A port 20 through the cylinder wall puts the cylinder in open communication with the atmosphere when the piston is moved upwardly clearing the port 20, best shown in Fig. 2.

The operation of my valve is as follows: When the air from the compressor is discharged through the line 8, the air under equal pressure flows through the T 10 to the pipe 7 and is discharged into my valve on the top side of the piston, at the same time flowing from the T to the triple valve 9 and discharging into the auxiliary reservoir 5 through the connection 21 to the lower side of the piston, the piston then being under equal pressure on both ends.

When it is desired to evacuate the auxiliary reservoir of air, the hand wheel is turned anti-clockwise, which by means of the eccentric raises the piston to the position shown in Fig. 1 and the air escapes through the port 20.

The pressure having been equalized on both ends of the piston, the weight of the piston and the reaction of the torsion spring cause the piston to move downwardly closing the port 20.

If the piston should have a tendency to stick for any reason, when the air under pressure was again turned on the train line 8, the pressure would be greater on the top of the piston for two reasons, first because the pressure in the reservoir would not build up as fast as the pressure in the upper end of the cylinder, and secondly because the air flowing to the top side of the piston does not pass through any valves hence it would be under greater momentum than the air passing through the triple valve into the reservoir.

It is clearly obvious that a trainman passing from the front to the rear of a train of sixty cars would reach the end of the train practically a half hour sooner with the use of my valve than he can by use of the valves now used which require one minute's time per valve.

I wish it understood that while I have disclosed my preferred method of construction, I do not confine myself to the exact details illustrated and described, but desire it understood that my invention covers any modifications that would produce the results above outlined.

Having fully described my invention, what I claim as new and useful and desire to protect by Letters Patent is:

1. A release valve of the class described, comprising automatic means for closing said valve, automatic means for locking said valve in a closed position, manually operable means for unlocking said valve, manually operable means for opening said valve.

2. A release valve of the class described, comprising a cylinder having a port in one end, piston means for opening and closing said port, means for automatically closing said port, means for automatically locking said closing means in a closed position, manually operated means for unlocking said locking means.

3. A release valve of the class described, comprising a cylinder, a piston reciprocable in said cylinder, means for admitting air into each end of said cylinder, a release port in one end of said cylinder, means for opening and closing said port.

In witness whereof I have hereunto affixed my signature this 11th day of April, 1929.

NATHANIEL T. FOX.